Patented May 31, 1949

2,471,805

UNITED STATES PATENT OFFICE 2,471,805

METHOD OF TREATING OURICURY WAX AND RESULTING COMPOSITION

Edward A. Wilder, Racine, Wis., assignor to S. C. Johnson & Son, Inc., Racine, Wis.

No Drawing. Application October 19, 1946, Serial No. 704,537

11 Claims. (Cl. 106—271)

This invention relates to a method of treating ouricury wax and resulting composition. More particularly, it relates to an improved method of treating ouricury wax with a paraffin hydrocarbon and the resulting wax composition.

Ouricury wax is a hard vegetable wax which does not easily lend itself to ordinary methods of refining. As received, it contains a considerable amount of dirt and leafy matter; i. e. present shipments contain about 12% of dirt, leafy and other suspended matter. Efforts have heretofore been made to blend ouricury wax with paraffin and carnauba wax for use in paste and liquid wax polishes. In order to remove the suspended matter from the ouricury wax, an attempt was made to filter the wax through a press, but this method was unsuccessful because of the immobility of the wax. The ouricury wax was then placed in a kettle with carnauba wax and paraffin and one percent by weight of an activated clay. The waxes were heated to 200° F. with stirring, and then let stand, taking care to keep the temperature of the waxes above their melting points. After the waxes had been let stand overnight, dirt and leafy matter was removed by decanting.

The wax blend including the ouricury wax was then made into liquid wax polish and paste wax polish and it was found that a cloudiness appeared when the hydrocarbon solvents were added, and remained as a suspension at temperatures far above the wax precipitation temperature. In addition it was found that when more than five percent of total wax content was ouricury, this wax detrimentally affected the gel strength of the paste and the body of the liquid wax polish.

Now, in accordance with my invention, I have found an improved method of refining ouricury wax which comprises treating the ouricury wax with at least 25% by weight of a paraffin hydrocarbon having at least 6 carbon atoms and recovering the treated ouricury wax. The treatment includes mixing the ouricury wax with the paraffin hydrocarbon in fluid state, filtering and recovering the ouricury from the soluble portion. This paraffin hydrocarbon treatment not only easily and efficiently removes all the suspended matter such as dirt and leafy matter, but in addition removes a resinous matter from the ouricury wax. The thus treated ouricury wax may be blended with other waxes in liquid and paste wax polishes without causing cloudiness or precipitation. There may be included in the liquid or paste wax polishes up to 16% of the total wax content by weight of this paraffin hydrocarbon-treated ouricury wax without detrimentally affecting the gel strength of the paste wax or the body of the liquid wax polish.

In addition, I have therefore prepared a wax composition comprising carnauba, paraffin and up to 16% of the total wax content by weight of ouricury wax, said ouricury wax having been pretreated with at least 25% by weight of a paraffin hydrocarbon having at least 6 carbon atoms. The wax composition may be either in paste or liquid form.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

Example 1

Seventy-five parts ouricury wax, containing about 12% by weight of dirt, leafy and other suspended matter, together with 25 parts naphtha and 5 parts diatomaceous silica (a filter acid) were charged into an open vessel. The mixture was heated to about 200° F. until a homogeneous mixture was obtained. The mixture was then filtered by means of a filter and the suspended matter was removed. This suspended matter consisted of dirt, leafy matter and a small amount of resinous matter. The ouricury wax was then recovered from the filtrate by stripping off the naphtha.

Example 2

Fifty parts ouricury wax, containing about 12% by weight of dirt, leafy and other suspended matter, together with 50 parts heptane and 5 parts diatomaceous silica were charged into an open vessel. The mixture was heated to about 150° F. until a homogeneous mixture was obtained. The mixture was then filtered by means of a filter and the suspended matter was removed. This suspended matter consisted of dirt, leafy matter and a small amount of resinous matter. The ouricury wax was then recovered from the filtrate by stripping off the heptane.

Example 3

Example 1 was repeated using heptane in place of the naphtha. The heptane was the equivalent of naphtha as the paraffin hydrocarbon.

Example 4

Fifty parts ouricury wax, containing about 12% by weight of dirt, leafy and other suspended matter, together with 50 parts paraffin and 5 parts diatomaceous silica were charged into an open vessel. The mixture was heated to about 200° F. until a homogeneous mixture was obtained. The mixture was filtered by means of a filter and the suspended matter was removed. The suspended matter consisted of dirt, leafy and a small amount of resinous matter.

The ouricury wax was present in the filtrate together with the paraffin.

Suggested formulas for paste wax wherein pre-treated ouricury wax as shown in Example 1 may be used in varying amounts up to 16% of the total wax content are as follows:

*Formula A containing about 5% ouricury*

| | Parts |
|---|---|
| Pre-treated ouricury wax | 2 |
| Carnauba wax | 13 |
| Paraffin | 23 |
| Naphtha | 114 |

*Formula B containing about 10% ouricury*

| | Parts |
|---|---|
| Pre-treated ouricury wax | 4 |
| Carnauba wax | 11 |
| Paraffin | 23 |
| Naphtha | 114 |

*Formula C containing about 16% ouricury*

| | Parts |
|---|---|
| Pre-treated ouricury wax | 6 |
| Carnauba wax | 9 |
| Paraffin | 23 |
| Naphtha | 114 |

To prepare paste wax, the waxes are melted together in an open kettle at a temperature of about 200° F. and when molten, naphtha is added. The hot wax solution is then placed into containers and allowed to cool. Although the Formulas A, B and C contain up to about 16% of pre-treated ouricury wax based on the total wax content, the gel strength is excellent and no cloudiness or precipitate appears when the waxes are in solution.

Suggested formulations for liquid wax wherein pre-treated wax as shown in Example 1 is used in varying amounts up to 16% of the total wax content are as follows:

*Formula D containing 5% ouricury*

| | Parts |
|---|---|
| Pre-treated ouricury wax | 5 |
| Carnauba wax | 35 |
| Beeswax | 10 |
| Paraffin | 50 |
| Naphtha | 900 |

*Formula E containing 10% ouricury*

| | Parts |
|---|---|
| Pre-treated ouricury wax | 10 |
| Carnauba wax | 30 |
| Beeswax | 10 |
| Paraffin | 50 |
| Naphtha | 900 |

*Formula F containing 16% ouricury*

| | Parts |
|---|---|
| Pre-treated ouricury wax | 16 |
| Carnauba wax | 24 |
| Beeswax | 10 |
| Paraffin | 50 |
| Naphtha | 900 |

To prepare liquid wax, the waxes are melted together in an open kettle at a temperature of about 200° F. and when molten, naphtha is added and thoroughly mixed. The resulting liquid wax is then placed into containers. Although the Formulas D, E and F contain up to 16% of pre-treated ouricury wax, based on the total wax content, the body of the polish is excellent and no cloudiness or precipitate appears when the waxes are in solution.

In the suggested formulations it will be seen that pre-treated ouricury wax may be used in varying amounts up to about 16% of the total wax content in either the paste wax polish or the liquid wax polish. While the pre-treated ouricury wax may be incorporated in any desired amount up to about 16%, it has been found that when a larger amount is incorporated, it adversely affects both the gel strength of the paste wax polish, and the body strength of the liquid wax polish. In other words, when more than 16% of the total wax content of paste wax is pre-treated ouricury, the gel strength is unsatisfactory. Likewise, when more than 16% of the total wax content of liquid wax is pre-treated ouricury, the body strength of the liquid wax is insufficient to hold the wax in suspension, and some of the wax settles out.

While in the examples, heptane, naphtha and paraffin have been used in illustration of paraffin hydrocarbons, the invention is not so limited. In pre-treating the ouricury wax any paraffin hydrocarbon may be used which has at least 6 carbon atoms. This includes hexane, heptane, octane, nonane, decane and higher alkyl paraffin hydrocarbons up to and including those having the formula $C_{35}H_{72}$ and other solid paraffins. While hexane may be used, care should be taken to carry out the reaction below the boiling point of the hexane, and if necessary to accomplish this, the reaction should be carried out under pressure. Because of availability and price, heptane, naphtha and paraffin wax are preferred.

When naphtha or paraffin are used, as the paraffin hydrocarbon, it ordinarily will not be necessary to recover the ouricury wax from the filtrate, as the mixture may be used in the making of either paste or liquid wax polish according to the formulas shown.

The amount of paraffin hydrocarbon used to treat the ouricury wax may vary, but at least 25% by weight is necessary to accomplish an efficient physical separation of the suspended matter. Ordinarily the amount of paraffin hydrocarbon will vary within the range from about 25% to about 50% by weight of the ouricury wax. However, if desired, larger amounts of paraffin hydrocarbon may be used, but without adding to the efficiency of the process.

The temperature used in the pre-treatment of the ouricury wax will vary somewhat depending upon the particular paraffin hydrocarbon, and the amount of hydrocarbon used. However, in practice, it has been found that a temperature of at least 150° F. is desired, and a temperature within the range of from about 180° F. to about 200° F. is preferred.

While several formulations have been shown for both liquid and paste wax, these are representative only and not to be construed as a limitation. For example, while naphtha has been shown as the solvent in both the liquid and paste wax, other organic solvents such as turpentine, Stoddard solvent, benzene, gasoline or the like may be used.

In the wax formulations, the waxes common to all formulations shown are carnauba wax, ouricury wax and paraffin. While these three waxes are ingredients, other waxes and resins, both natural and synthetic may be included, if desired.

The term paraffin within the meaning of the specification and claims shall include crystalline and microcrystalline paraffins which are mixtures of hydrocarbons derived from petroleum, and mineral wax or native paraffin known as ozokerite.

It will thus be seen, that in accordance with my invention, a very efficient process has been developed for separating not only dirt and leafy matter from the ouricury wax, but in addition it removes a resinous matter which is present in small quantities as a suspended matter in the untreated ouricury wax. An excellent paste wax polish or liquid wax polish may thus be prepared containing up to 16% of the total weight of the wax content of pre-treated ouricury wax.

Other modes of applying the principle of the invention may be employed instead of those explained, change being made as regards the composition or method herein disclosed, provided the step or steps stated by any of the following claims or the equivalent of such stated step or steps be employed.

I claim:

1. A wax composition comprising carnauba wax, paraffin and up to about 16% of the total wax content by weight of ouricury wax, and a volatile solvent said ouricury wax having been pre-treated with at least 25% by weight of a paraffin hydrocarbon having at least 6 carbon atoms at a temperature of at least 150° F., the insoluble portion having been separated and the ouricury wax recovered from the soluble portion.

2. A wax composition comprising carnauba wax, paraffin and up to about 16% of the total wax content by weight of ouricury wax, and a volatile solvent said ouricury wax having been pre-treated with at least 25% by weight of naphtha at a temperature of at least 150° F., the insoluble portion having been separated and the ouricury wax recovered from the soluble portion.

3. A wax composition comprising carnauba wax, paraffin and up to about 16% of the total wax content by weight of ouricury wax, and a volatile solvent said ouricury wax having been pre-treated with at least 25% by weight of heptane at a temperature of at least 150° F., the insoluble portion having been separated and the ouricury wax recovered from the soluble portion.

4. A wax composition comprising carnauba wax, paraffin and up to about 16% of the total wax content by weight of ouricury wax, and a volatile solvent said ouricury wax having been pre-treated with at least 25% by weight of paraffin at a temperature of at least 150° F., the insoluble portion having been separated and the ouricury wax recovered from the soluble portion.

5. A process of refining solid ouricury wax comprising contacting ouricury wax with at least 25% by weight of a paraffin hydrocarbon having at least 6 carbon atoms at a temperature of at least 150° F., separating the insoluble portion, and recovering ouricury wax from the soluble portion.

6. A process of refining solid ouricury wax comprising contacting ouricury wax with at least 25% by weight of naphtha at a temperature of at least 150° F., separating the insoluble portion, and recovering ouricury wax from the soluble portion.

7. A process of refining solid ouricury wax comprising contacting ouricury wax with at least 25% by weight of naphtha at a temperature within the range of from about 180° F. to about 200° F., separating the insoluble portion, and recovering ouricury wax from the soluble portion.

8. A process of refining solid ouricury wax comprising contacting ouricury wax with at least 25% by weight of heptane at a temperature of at least 150° F., separating the insoluble portion, and recovering ouricury wax from the soluble portion.

9. A process of refining solid ouricury wax comprising contacting ouricury wax with at least 25% by weight of heptane at a temperature within the range of from about 180° F. to about 200° F., separating the insoluble portion, and recovering ouricury wax from the soluble portion.

10. A process of refining solid ouricury wax comprising contacting ouricury wax with at least 25% by weight of paraffin at a temperature of at least 150° F., separating the insoluble portion, and recovering ouricury wax from the soluble portion.

11. A process of refining solid ouricury wax comprising contacting ouricury wax with at least 25% by weight of paraffin at a temperature within the range of from about 180° F. to about 200° F., separating the insoluble portion, and recovering ouricury wax from the soluble portion.

EDWARD A. WILDER.

REFERENCES CITED

The following references are of record in the file of this patent:

UNITED STATES PATENTS

| Number | Name | Date |
| --- | --- | --- |
| 2,078,971 | Pickens et al. | May 4, 1937 |
| 2,118,521 | Pickens | May 24, 1938 |
| 2,275,661 | Steinle et al. | Mar. 10, 1942 |
| 2,281,865 | Van Dijk | May 5, 1942 |
| 2,374,414 | Cartwright | Apr. 7, 1945 |
| 2,381,420 | Balch | Aug. 7, 1945 |
| 2,428,813 | Rhodes et al. | Oct. 14, 1947 |
| 2,452,093 | Balch | Oct. 26, 1948 |
| 2,456,656 | Swenson | Dec. 21, 1948 |

OTHER REFERENCES

Bennett: Commercial Waxes, 1944, pages 81–82.
Lewkowitsch: Chemical Technology and Analyses of Oils, Fats and Waxes, 5th ed., 1914, vol. II, page 880.